(12) United States Patent
Houck

(10) Patent No.: US 12,038,616 B2
(45) Date of Patent: Jul. 16, 2024

(54) PHOTONIC STRUCTURE WITH HEAT-ACTIVATED OPTICAL TRANSMISSION

(71) Applicant: VIAVI Solutions Inc., Chandler, AZ (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/352,488

(22) Filed: Jul. 14, 2023

(65) Prior Publication Data
US 2023/0358977 A1    Nov. 9, 2023

Related U.S. Application Data

(63) Continuation of application No. 17/643,327, filed on Dec. 8, 2021, now Pat. No. 11,733,468.

(51) Int. Cl.
*G02B 6/42* (2006.01)
(52) U.S. Cl.
CPC ......... *G02B 6/4214* (2013.01); *G02B 6/4268* (2013.01)
(58) Field of Classification Search
CPC ...... G02B 6/4214; G02B 6/4268; G02B 6/12; G02B 6/122; G02B 6/1225; G02B 2006/12083; G02B 2006/12126; G02B 2006/12133; G02F 1/0147; G02F 1/0151; G02F 1/025
See application file for complete search history.

(56) References Cited

U.S. PATENT DOCUMENTS

| | | | |
|---|---|---|---|
| 5,319,482 A | 6/1994 | Tsuchiya et al. |
| 5,329,601 A | 7/1994 | Nakamura |
| 5,887,089 A | 3/1999 | Deacon et al. |
| 5,953,467 A | 9/1999 | Madsen |
| 6,061,369 A | 5/2000 | Conradi |
| 6,141,465 A | 10/2000 | Bischel et al. |
| 6,166,838 A | 12/2000 | Liu et al. |
| 6,167,169 A | 12/2000 | Brinkman et al. |
| 6,321,011 B2 | 11/2001 | Deacon |
| 6,330,388 B1 | 12/2001 | Bendett et al. |
| 6,393,186 B1 | 5/2002 | Deacon |
| 6,493,478 B1 | 12/2002 | DeRosa et al. |
| 6,519,059 B1 | 2/2003 | Doerr et al. |
| 6,522,794 B1 | 2/2003 | Bischel et al. |
| 6,522,812 B1 | 2/2003 | Nikonov |
| 6,552,833 B2 | 4/2003 | Liu et al. |

(Continued)

*Primary Examiner* — Andrew Jordan
(74) *Attorney, Agent, or Firm* — Harrity & Harrity, LLP

(57) ABSTRACT

A photonic system includes a light source and a photonic structure. The photonic structure includes an optical transmission structure and an optical absorption structure. The optical transmission structure is configured to transmit light associated with a first wavelength range. The optical absorption structure is configured to absorb light associated with a second wavelength range. The light source is configured to provide a light beam with a wavelength that is within the second wavelength range to the optical absorption structure. The optical absorption structure is configured to generate and provide heat to the optical transmission structure when the light beam falls incident on the optical absorption structure.

20 Claims, 6 Drawing Sheets

(56) References Cited

U.S. PATENT DOCUMENTS

| | | |
|---|---|---|
| 6,563,966 B1 | 5/2003 | Tang |
| 6,600,582 B1 | 7/2003 | Liu et al. |
| 6,636,678 B1 | 10/2003 | Bendett et al. |
| 6,674,929 B2 | 1/2004 | Feng et al. |
| 6,690,873 B2 | 2/2004 | Bendett et al. |
| 6,707,969 B2 | 3/2004 | Kim |
| 6,710,366 B1 | 3/2004 | Lee et al. |
| 6,724,952 B2 | 4/2004 | Doerr |
| 6,724,968 B2 | 4/2004 | Lackritz et al. |
| 6,785,434 B2 | 8/2004 | Castoldi et al. |
| 6,792,182 B1 | 9/2004 | Davies et al. |
| 6,810,168 B1 | 10/2004 | Feng et al. |
| 6,819,845 B2 | 11/2004 | Lee et al. |
| 6,859,574 B2 | 2/2005 | Doerr et al. |
| 6,961,499 B2 | 11/2005 | Lee et al. |
| 7,020,372 B2 | 3/2006 | Lee et al. |
| 7,035,505 B2 | 4/2006 | Shen et al. |
| 7,043,113 B2 | 5/2006 | Hattori et al. |
| 7,215,856 B2 | 5/2007 | Osellame et al. |
| 7,221,821 B2 | 5/2007 | Eldada |
| 7,254,293 B1 | 8/2007 | Helkey et al. |
| 7,386,206 B2 | 6/2008 | Tabuchi et al. |
| 7,400,793 B2 | 7/2008 | Tabuchi et al. |
| 7,428,352 B2 | 9/2008 | Noda et al. |
| 7,501,225 B2 | 3/2009 | Miura |
| 7,653,109 B2 | 1/2010 | Bischel et al. |
| 7,903,909 B2 | 3/2011 | Popovic |
| 8,032,027 B2 | 10/2011 | Popovic |
| 8,064,769 B2 | 11/2011 | Galli et al. |
| 8,086,080 B2 | 12/2011 | Wagener et al. |
| 8,340,478 B2 | 12/2012 | Popovic |
| 8,639,069 B1 | 1/2014 | Helkey et al. |
| 8,655,114 B2 | 2/2014 | Popovic |
| 9,046,494 B2 | 6/2015 | Song et al. |
| 9,063,354 B1 | 6/2015 | Rakich et al. |
| 9,677,916 B2 | 6/2017 | Hegyi et al. |
| 10,866,364 B1 | 12/2020 | Jones et al. |
| 11,372,159 B2 | 6/2022 | Tanaka et al. |
| 11,531,165 B2 | 12/2022 | Jones et al. |
| 11,733,468 B2 * | 8/2023 | Houck ................. G02B 6/4268 385/14 |
| 2001/0031122 A1 * | 10/2001 | Lackritz ................. G02B 6/42 430/290 |
| 2002/0110328 A1 | 8/2002 | Bischel et al. |
| 2003/0031402 A1 * | 2/2003 | DeRosa ................. G02F 1/061 385/140 |
| 2003/0190111 A1 | 10/2003 | Nystrom |
| 2003/0190112 A1 * | 10/2003 | Doerr ................. G02B 6/32 385/33 |
| 2003/0210848 A1 | 11/2003 | Troll |
| 2004/0105611 A1 | 6/2004 | Bischel et al. |
| 2004/0126072 A1 * | 7/2004 | Hoon Lee ............ G02B 6/1225 385/27 |
| 2004/0151432 A1 * | 8/2004 | Tabuchi ............. G02B 6/12019 385/37 |
| 2004/0202409 A1 * | 10/2004 | Hattori ................. G02B 6/4215 385/24 |
| 2004/0247239 A1 | 12/2004 | Eldada |
| 2005/0031259 A1 * | 2/2005 | Shen ................. H04B 10/0795 385/24 |
| 2005/0046928 A1 | 3/2005 | Bischel et al. |
| 2005/0058415 A1 * | 3/2005 | Lee ................. B82Y 20/00 257/E29.082 |
| 2005/0058416 A1 * | 3/2005 | Hoon Lee ............ G02F 1/3515 257/E29.082 |
| 2005/0094935 A1 | 5/2005 | Hattori et al. |
| 2005/0129404 A1 | 6/2005 | Kim et al. |
| 2005/0175278 A1 * | 8/2005 | Eldada ................. G02B 6/274 385/27 |
| 2006/0002653 A1 | 1/2006 | Grunnet-Jepsen et al. |
| 2006/0051013 A1 | 3/2006 | Graves |
| 2006/0257091 A1 * | 11/2006 | Tabuchi ............. G02B 6/12011 385/132 |
| 2007/0248139 A1 * | 10/2007 | Bischel ................. G02B 6/4286 372/75 |
| 2008/0002931 A1 * | 1/2008 | Noda ................... G02B 6/1225 385/16 |
| 2008/0253767 A1 * | 10/2008 | Galli ..................... H04J 14/021 398/45 |
| 2009/0028501 A1 * | 1/2009 | Wagener ............. G02B 6/29311 385/18 |
| 2010/0209038 A1 * | 8/2010 | Popovic ................. G02F 1/3133 385/27 |
| 2016/0018319 A1 * | 1/2016 | Hegyi ................. G01D 5/35316 356/73.1 |
| 2020/0174184 A1 | 6/2020 | Dragic et al. |
| 2020/0371295 A1 * | 11/2020 | Jones ................. H04Q 11/0001 |
| 2021/0063647 A1 * | 3/2021 | Jones ..................... H04B 10/03 |
| 2021/0167230 A1 | 6/2021 | Pelletier et al. |
| 2021/0238733 A1 | 8/2021 | Houck et al. |
| 2021/0239901 A1 * | 8/2021 | Tanaka ..................... G02B 6/36 |
| 2022/0043204 A1 | 2/2022 | Houck |
| 2023/0176302 A1 | 6/2023 | Houck |
| 2023/0358977 A1 * | 11/2023 | Houck ................... G02F 1/025 |

\* cited by examiner

PHOTONIC STRUCTURE WITH HEAT-ACTIVATED OPTICAL TRANSMISSION

RELATED APPLICATION

This application is a continuation of U.S. patent application Ser. No. 17/643,327, filed Dec. 8, 2021, which is incorporated herein by reference in its entirety.

BACKGROUND

Integrated photonics is a branch of photonics in which waveguides and other photonic devices are fabricated as an integrated structure on a substrate surface. For example, a photonic integrated circuit (PIC) may use semiconductor-grade materials (e.g., silicon, indium phosphide, dielectrics such as silicon dioxide or silicon nitride, and/or the like) as a platform to integrate active and passive photonic circuits with electronic components on a single chip. As a result of integration, complex photonic circuits can process and transmit light (e.g., photons) in similar ways to how electronic integrated circuits process and transmit electrons.

SUMMARY

In some implementations, a photonic structure includes an optical transmission structure that is disposed within the photonic structure; and an optical absorption structure that is disposed within the photonic structure and adjacent to at least one surface of the optical transmission structure, wherein: the optical transmission structure is configured to transmit light associated with a first wavelength range, and the optical absorption structure is configured to absorb light associated with a second wavelength range, wherein the optical absorption structure is configured to generate and provide heat to the optical transmission structure when a light beam with a wavelength that is within the second wavelength range falls incident on the optical absorption structure.

In some implementations, a photonic system includes a light source; and a photonic structure that includes an optical transmission structure and an optical absorption structure, wherein: the optical transmission structure is configured to transmit light associated with a first wavelength range, the optical absorption structure is configured to absorb light associated with a second wavelength range, the light source is configured to provide a light beam with a wavelength that is within the second wavelength range to the optical absorption structure, and the optical absorption structure is configured to generate and provide heat to the optical transmission structure when the light beam falls incident on the optical absorption structure.

In some implementations, a photonic structure includes a first optical transmission structure that is disposed within a first layer of the photonic structure; a second optical transmission structure that is disposed within a second layer of the photonic structure that is different than the first layer; a first optical absorption structure that is disposed adjacent to at least one surface of the first optical transmission structure; and a second optical absorption structure that is disposed adjacent to at least one surface of the second optical transmission structure, wherein: the first optical transmission structure is configured to transmit light associated with a first wavelength range, the second optical transmission structure is configured to transmit light associated with a second wavelength range, the first optical absorption structure is configured to absorb light associated with a third wavelength range and to generate and provide heat to the first optical transmission structure when a first light beam with a wavelength that is within the third wavelength range falls incident on the first optical absorption structure, and the second optical absorption structure is configured to absorb light associated with a fourth wavelength range and to generate and provide heat to the second optical transmission structure when a second light beam with a wavelength that is within the fourth wavelength range falls incident on second first optical absorption structure.

DETAILED DESCRIPTION

Figure 1:
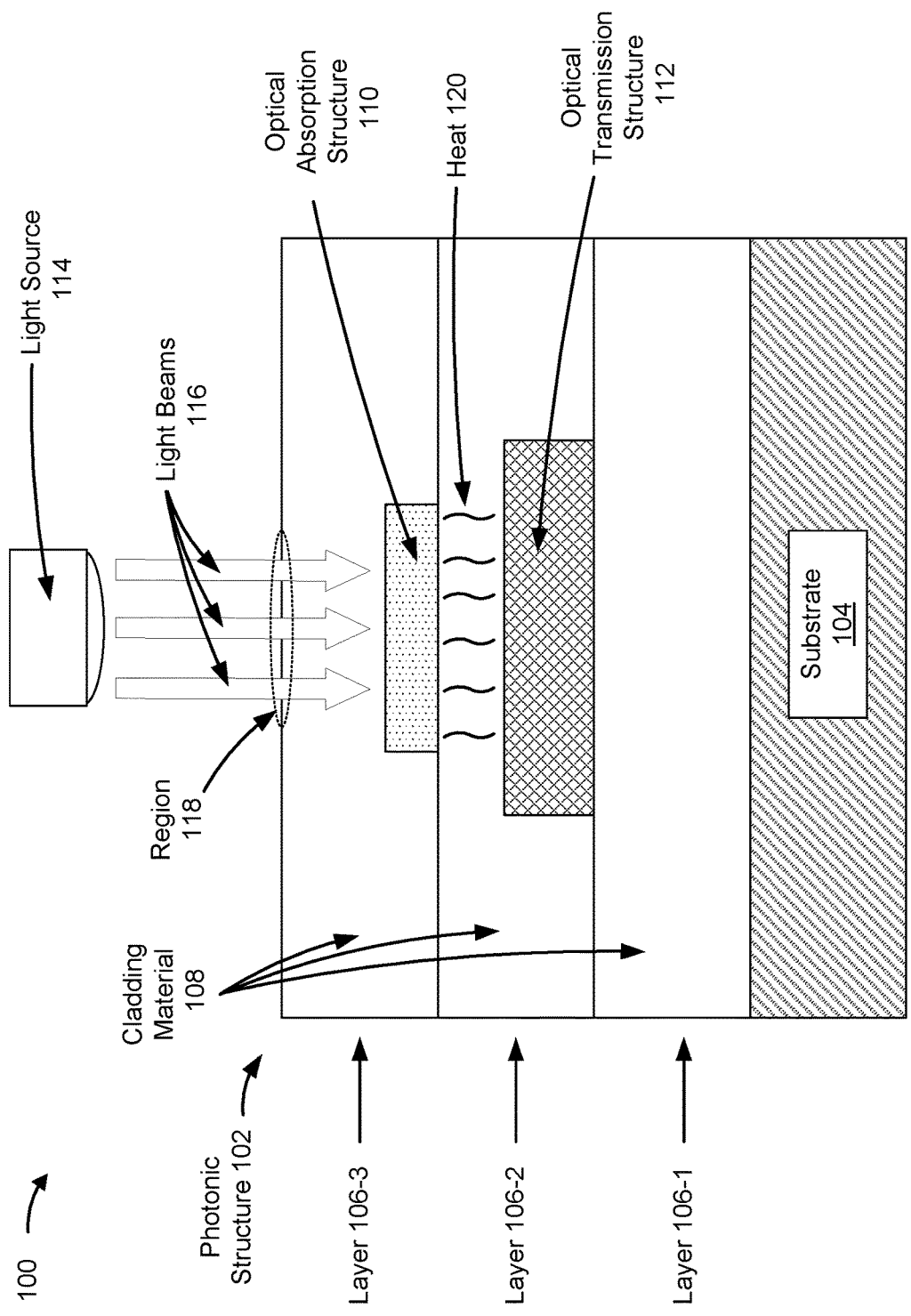
FIG. 1 is a diagram of an example photonic system described herein.

The following detailed description of example implementations refers to the accompanying drawings. The same reference numbers in different drawings may identify the same or similar elements.

A conventional photonic integrated circuit (PIC) (e.g., that comprises an interferometer) often includes multiple optical transmission structures (e.g., waveguides) that transmit light. In many cases, light that transmits through a first optical transmission structure of the PIC needs to be phase matched to light that transmits through a second optical transmission structure of the PIC. Accordingly, the PIC typically includes one or more resistive microheaters (e.g., integrated metal components) to heat portions of the first optical transmission structure and/or the second optical transmission structure. By supplying heat, optical properties, such as refractive indexes, of the first optical transmission structure and/or the second optical transmission structure may be adjusted, which can facilitate phase matching of light that transmits through the first optical transmission and light that transmits through the second optical transmission structure.

However, including the one or more resistive microheaters in the PIC increases a design complexity of the PIC. For example, the PIC needs to be designed to allow for additional processing to integrate the one or more resistive microheaters within the PIC, to allow for electrical circuitry to connect to the one or more resistive microheaters, and/or to allow for additional heat generated by the electrical circuitry. Thus, due to these complexities, PICs that include one or more resistive microheaters are typically limited to single layer implementations. This limits possible sizes and shapes of the PIC, which prevents the PIC from being used in some applications (e.g., applications that require multi-layer PICs).

Some implementations described herein provide a photonic system that includes a light source and a photonic structure. The photonic structure includes an optical transmission structure and an optical absorption structure. The optical transmission structure is configured to transmit light associated with a first wavelength range and the optical absorption structure is configured to absorb light associated with a second wavelength range. Accordingly, the light source is configured to provide one or more light beams with a wavelength that is within the second wavelength range to the optical absorption structure. This causes the optical absorption structure to generate and provide heat to the optical transmission structure. Accordingly, the heat changes one or more optical properties of the optical transmission structure, such as a refractive index of the optical transmission structure.

In this way, the one or more optical properties of the optical transmission structure are "tuned" by heat supplied by the optical absorption structure (e.g., which facilitates phase matching, as described above). Because the heat is provided via optical heating, the photonic system can provide more precise temperature control and faster response (on/off) times (e.g., by controlling an on/off time of the light source, an optical power of the light source, and/or other characteristics of the light source) than that provided by resistive microheaters (e.g., that have slower response times and less precise temperature control). Further, using an optical absorption structure reduces a design complexity of the photonic structure by eliminating a need for routing electrical circuitry for resistive microheaters and compensating for thermal effects of the electrical circuitry. Accordingly, due to reduced design complexities, some implementations described herein facilitate multi-layer photonic structure designs that include multiple optical transmission structures and multiple optical absorption structures, which enables the photonic transmission structure to be used in some applications (e.g., applications that require multi-layer photonic structures) that would not otherwise use a conventional PIC.

FIG. 1 is a diagram of an example photonic system 100 described herein. As shown in FIG. 1, the photonic system 100 may include a photonic structure 102. The photonic structure 102 may be, for example, an optical logic gate, an optical switch, an optical amplifier, an optical modulator, and/or a frequency comb.

As shown in FIG. 1, the photonic structure 102 may include a substrate 104, one or more layers 106, a cladding material 108, an optical absorption structure 110, and/or an optical transmission structure 112. The substrate 104 may include a substrate upon which other layers and/or structures shown in FIG. 1 are formed. The substrate 104 may be a transmissive substrate, such as a glass substrate, a silicon substrate, or a germanium substrate. As further shown in FIG. 1, the one or more layers 106 (shown as layers 106-1 through 106-3 in FIG. 1) may be disposed on the substrate 104 (e.g., on a top surface of the substrate 104). The cladding material 108, the optical absorption structure 110, and/or the optical transmission structure 112 may be included in the one or more layers 106, as described herein.

The cladding material 108 may be configured to confine light (e.g., light that transmits through the optical transmission structure 112, as further described herein). In some implementations, the cladding material 108 may be configured to thermally conduct heat (e.g., thermally conduct heat that is generated and provided by the optical absorption structure 110 to the optical transmission structure 112, as further described herein). The cladding material 108 may include, for example, an oxide material (e.g., a silicon dioxide material), a polymer material (e.g., a siloxane polymer material), or another cladding material.

The optical absorption structure 110 may be configured to absorb light. For example, the optical absorption structure 110 may be configured to absorb a particular percentage of light (e.g., a percentage amount of light that satisfies a percentage threshold), such as a particular percentage that is less than or equal to 20 percent, 35 percent, 60 percent, or 65 percent of light, that falls incident on the optical absorption structure 110. The optical absorption structure 110 may include an absorptive thin film structure (e.g., comprising one or more absorptive thin films), an absorptive glass, an absorptive pigment or dye, or another type of optical absorption structure. In some implementations, the optical absorption structure 110 may comprise at least one of tantalum, nickel, copper, aluminum, niobium, silver, zinc, chromium, hafnium, thallium, silicon, niobium tantalum, silylidyne, germanium, silicon germanium, an oxidized metal, a sub-stoichiometric nitride, and/or any other material that is configured to absorb light.

The optical transmission structure 112 may be configured to transmit light. For example, the optical transmission structure 112 may include at least a portion of a waveguide structure, an interferometer structure, an optical switch structure, an optical resonator structure, and/or another optical transmission structure of the photonic structure 102. In some implementations, the optical transmission structure 112 may comprise at least one of a non-alkali, oxide solution that includes a cation that is niobium (e.g., a niobium tantalum oxide solution, a niobium titanium oxide solution, and/or a niobium tantalum titanium oxide solution, among other examples), an amorphous silicon material, a hydrogenated amorphous silicon material, a nitride-based material, an oxide-based material, a metal material, or a semiconductor material, among other examples.

In some implementations, the optical absorption structure 110 and/or the optical transmission structure 112 may be disposed within the photonic structure 102. For example, as shown in FIG. 1, the optical absorption structure 110 and the optical transmission structure 112 may be disposed in different layers 106, of the one or more layers 106, of the photonic structure 102. Accordingly, the optical absorption structure 110 may be positioned within the photonic structure 102 such that the optical absorption structure 110 is adjacent to at least one surface of the optical transmission structure 112. For example, as shown in FIG. 1, the optical absorption structure 110 may be included in a layer (e.g., layer 106-3) of the photonic structure 102 that is disposed on another adjacent layer (e.g., layer 106-2) of the photonic structure 102 that includes the optical transmission structure 112. Therefore, the optical absorption structure 110 is adjacent to at least a top surface of the optical transmission structure 112 (e.g., the optical absorption structure 110 is closer to the top surface of the optical transmission structure 112 than to another surface of the optical transmission structure 112). Additionally, or alternatively, the optical absorption structure 110 may be adjacent to at least one surface of the optical transmission structure 112 when a distance between the optical absorption structure 110 and the at least one surface of the optical transmission structure 112 satisfies a distance threshold, which may be less than or equal to 100 nanometers (nm).

In some implementations, the cladding material 108 may disposed within the photonic structure 102, such as within at least one of the one or more layers 106. For example, as shown in FIG. 1, each of the one or more layers 106 (e.g., layer 106-1 through 106-3) may include the cladding material 108. In some implementations, as further shown in FIG. 1, at least a portion of the cladding material 108 may be disposed between the optical absorption structure 110 and the optical transmission structure 112 (e.g., between at least one surface of the optical absorption structure 110 and at least one surface of the optical transmission structure 112).

In some implementations, the optical transmission structure 112 may be configured to transmit, within the optical transmission structure 112, light associated with a first wavelength range. For example, the optical transmission structure 112 may be configured to transmit light that has a wavelength within a wavelength range of 1200-1600 nanometers (nm) (e.g., light that has a wavelength that is greater than or equal to 1200 nm and less than or equal to 1600 nm). Further, in some implementations, the optical absorption structure 110 may be configured to absorb light associated with a second wavelength range. For example, the optical absorption structure 110 may be configured to absorb light that has a wavelength within a wavelength range of 800-1199 nm (e.g., light that has a wavelength that is greater than or equal to 800 nm and less than or equal to 1199 nm).

In some implementations, the optical transmission structure 112 may be configured to be transmissive to light associated with the second wavelength range. For example, the optical transmission structure 112 may be configured to be transmissive to light that has a wavelength within a wavelength range of 800-1199 nm. In this way, light associated with the second wavelength range may not interfere with, or otherwise affect, transmission of light associated with the first wavelength within the optical transmission structure 112 (e.g., when the light associated with the second wavelength range passes through the optical transmission structure 112). Additionally, or alternatively, the cladding material 108 may be configured to be transmissive to light associated with the second wavelength range. In this way, light associated with the second wavelength may propagate through the cladding material 108 to the optical transmission structure 112 (e.g., as further described herein) with little loss of optical energy.

In some implementations, the photonic system 100 may include a light source 114. The light source 114 may be a laser device, a light-emitting diode (LED) light device, an incandescent light device, a fluorescent light device, a halogen light device, and/or another type of light source. The light source 114 may be configured to provide one or more light beams 116 with wavelengths that are each within the second wavelength range. For example, as shown in FIG. 1, the light source 114 may provide one or more light beams 116 that each have a wavelength that is within a wavelength subrange of the second wavelength range, such as wavelength subrange of 850-949 nm (e.g., the one or more light beams 116 may have wavelengths that are each greater than or equal to 850 nm and less than or equal to 949 nm).

In some implementations, the light source 114 may be disposed over a surface of the photonic structure 102. For example, as shown in FIG. 1, the light source 114 may be disposed over a top surface of the photonic structure 102. Accordingly, as further shown in FIG. 1, the light source 114 may be configured to provide the one or more light beams 116 to a region 118 of the surface of the photonic structure 102 (e.g., a region 118 of the top surface of the photonic structure 102). In some implementations, the region 118 may include an antireflective coating that is configured to reduce reflection of light associated with the second wavelength range. In this way, the region 118 reduces, when the one or more light beams 116 fall incident on the region 118, an amount of the one or more light beams 116 that are reflected from the region 118 of the photonic structure 102 (e.g., as compared to when the one or more light beams 116 fall incident on a region of a surface of the photonic structure 102 without an antireflective coating). Accordingly, the region 118 may facilitate the one or more light beams 116 entering the photonic structure 102 with little loss of optical energy.

In some implementations, the light source 114 may be configured to provide the one or more light beams 116 to the optical absorption structure 110 (e.g., via the region 118 of the photonic structure 102). For example, the light source 114 may be aimed to provide the one or more light beams 116 such that the one or more light beams 116 enter the photonic structure 102 via the region 118 of the top surface of the photonic structure 102 and propagate through a portion of the cladding material 108 (e.g., that is between the optical absorption structure 110 and the optical transmission structure 112) to the optical absorption structure 110 in the layer 106-3.

In some implementations, the optical absorption structure 110 may be configured to generate heat 120 when a light beam with a wavelength that is within the second wavelength range falls incident on the optical absorption structure 110. For example, when the one or more light beams 116 propagate to and fall incident on the optical absorption structure 110, the optical absorption structure 110 may be configured to generate the heat 120. The heat 120 that is generated by the optical absorption structure 110 may be within a heat range, such as 20 degrees Celsius (C) to 450 degree C. (e.g., the heat 120 may be greater than or equal to 20 degrees C. and less than or equal to 450 degrees C.).

In some implementations, the optical absorption structure 110 may be configured to provide the heat 120 to the optical transmission structure 112. For example, the optical absorption structure 110 may provide the heat 120 to the optical transmission structure 112 because the optical absorption structure 110 is adjacent to the at least one surface of the optical transmission structure 112 (e.g., the optical absorption structure 110 is near the at least one surface of the optical transmission structure 112, such as within 100 nm of the optical transmission structure 112). Additionally, or alternatively, the cladding material 108 may be configured to thermally conduct heat, and, therefore, the portion of the cladding material 108 that is between the optical absorption structure 110 and the optical transmission structure 112 may conduct the heat 120 from the optical absorption structure 110 to the optical transmission structure 112.

In some implementations, one or more optical properties of the optical transmission structure 112 may change as a result of the optical absorption structure 110 generating and providing the heat 120 to the optical transmission structure 112. For example, a refractive index of the optical transmission structure 112 may change as a result of the optical absorption structure 110 generating and providing the heat 120 to the optical transmission structure 112.

As indicated above, FIG. 1 is provided as an example. Other examples may differ from what is described with regard to FIG. 1. In practice, the photonic structure 102 may include additional layers and/or structures, fewer layers and/or structures, different layers and/or structures, or differently arranged layers and/or structures than those shown in FIG. 1.

Figure 2:
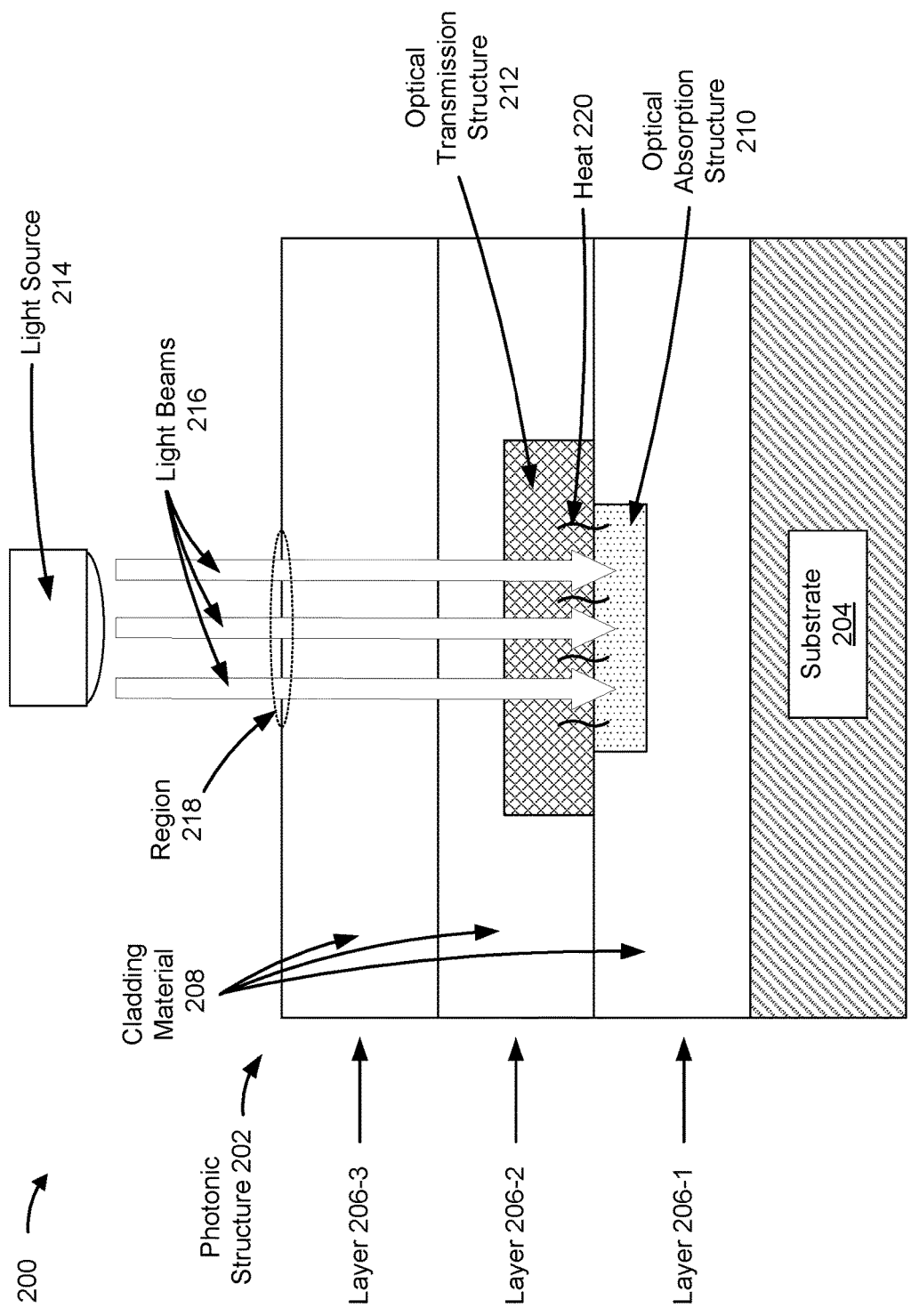
FIG. 2 is a diagram of an example photonic system described herein.

FIG. 2 is a diagram of an example photonic system 200 described herein. As shown in FIG. 2, the photonic system 200 may include a photonic structure 202, which may be similar to the photonic structure 102 described herein in relation to FIG. 1. For example, the photonic system 200 may include a substrate 204, one or more layers 206, a cladding material 208, an optical absorption structure 210, and/or an optical transmission structure 212 that are the same as, or similar to, corresponding elements of the photonic structure 102 described herein in relation to FIG. 1. In some implementations, the photonic system 200 may include a light source 214, which may be the same as, or similar to, the light source 114 described herein in relation to FIG. 1.

In some implementations, the optical transmission structure 212 and the optical absorption structure 210 may be disposed in different layers 206, of the one or more layers 206, of the photonic structure 202. For example, as shown in FIG. 2, the optical absorption structure 210 may be included in a layer 206 (e.g., layer 206-1), of the one or more layers 206, of the photonic structure 202 and the optical transmission structure 212 may be included in another layer 206 (e.g., layer 206-2), of the one or more layers 206, of the photonic structure 202. In some implementations, the optical absorption structure 210 may be disposed on at least one surface of the of the optical transmission structure 212 (e.g., the optical absorption structure 210 may contact the at least one surface of the optical transmission structure 212 without any cladding material 208 disposed between the optical absorption structure 210 and the optical transmission structure 212). For example, as further shown in FIG. 2, the optical absorption structure 210 may disposed on a bottom surface of the optical transmission structure 212.

In some implementations, the light source 214 may be disposed over a surface of the photonic structure 202. For example, as shown in FIG. 2, the light source 214 may be disposed over a top surface of the photonic structure 202. Accordingly, as further shown in FIG. 2, the light source 214 may be configured to provide one or more light beams 216 (e.g., that are same as, or similar to, the one or more light beams 116 described herein in relation to FIG. 1) to a region 218 of the surface of the photonic structure 202 (e.g., a region 218 of the top surface of the photonic structure 202). In some implementations, the region 218 may include an antireflective coating (e.g., in a same or similar manner as that of the region 118 described herein in relation to FIG. 1).

In some implementations, the light source 214 may be configured to provide the one or more light beams 216 to the optical absorption structure 210 (e.g., via transmission through the optical transmission structure 212). For example, the light source 214 may be aimed to provide the one or more light beams 216 such that the one or more light beams 216 enter the photonic structure 202 via the region 218 of the top surface of the photonic structure 202 and propagate through a portion of the cladding material 208 and the optical transmission structure 212 (e.g., because the cladding material 208 and the optical transmission structure 212 are transmissive to light associated with the second wavelength range, in a same or similar manner as that of the cladding material 108 and the optical transmission structure 112 described herein in relation to FIG. 1) to the optical absorption structure 210 in the layer 206-3.

In some implementations, the optical absorption structure 210 may be configured to generate heat 220 when a light beam with a wavelength that is within the second wavelength range falls incident on the optical absorption structure 210 (e.g., in a similar manner as that of the optical absorption structure 110 described herein in relation to FIG. 1). In some implementations, the optical absorption structure 210 may be configured to provide the heat 220 to the optical transmission structure 212. For example, the optical absorption structure 210 may provide the heat 220 to the optical transmission structure 212 because the optical absorption structure 210 is disposed on the at least one surface of the optical transmission structure 212. In some implementations, one or more optical properties of the optical transmission structure 212 may change as a result of the optical absorption structure 210 generating and providing the heat 220 to the optical transmission structure 212 (e.g., in a same or similar manner as that of optical transmission structure 112 described herein in relation to FIG. 1).

As indicated above, FIG. 2 is provided as an example. Other examples may differ from what is described with regard to FIG. 2. In practice, the photonic structure 202 may include additional layers and/or structures, fewer layers and/or structures, different layers and/or structures, or differently arranged layers and/or structures than those shown in FIG. 2.

Figure 3:
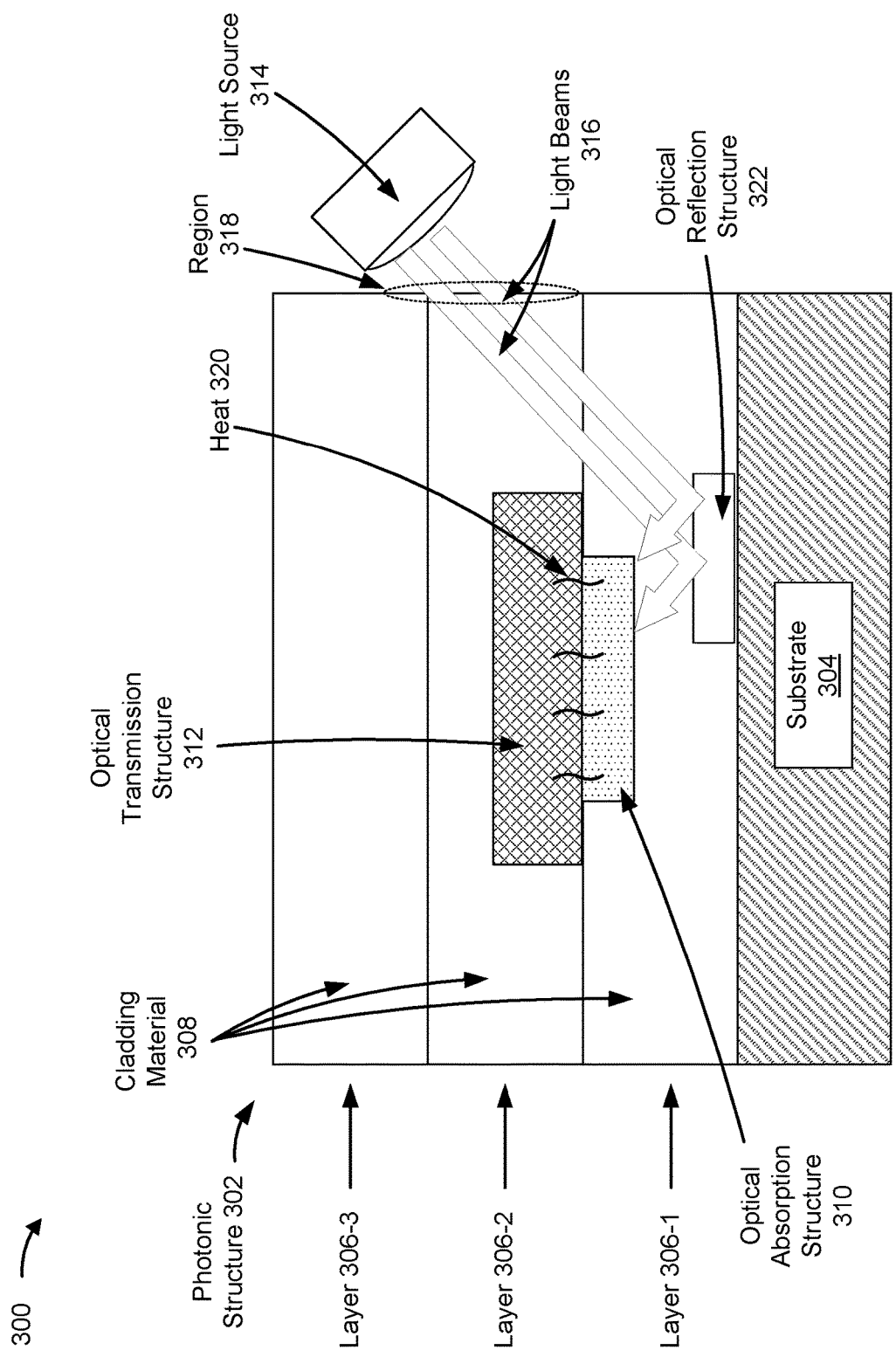
FIG. 3 is a diagram of an example photonic system described herein.

FIG. 3 is a diagram of an example photonic system 300 described herein. As shown in FIG. 3, the photonic system 300 may include a photonic structure 302, which may be similar to the photonic structure 102 described herein in relation to FIG. 1. For example, the photonic system 300 may include a substrate 304, one or more layers 306, a cladding material 308, an optical absorption structure 310, and/or an optical transmission structure 312 that are the same as, or similar to, corresponding elements of the photonic structure 102 described herein in relation to FIG. 1. In some implementations, the photonic system 300 may include a light source 314, which may be the same as, or similar to, the light source 114 described herein in relation to FIG. 1.

In some implementations, the optical transmission structure 312 and the optical absorption structure 310 may be disposed in different layers 306, of the one or more layers 306, of the photonic structure 302. For example, as shown in FIG. 3, the optical absorption structure 310 may be included in a layer 306 (e.g., layer 306-1), of the one or more layers 306, of the photonic structure 302 and the optical transmission structure 312 may be included in another layer 306 (e.g., layer 306-2), of the one or more layers 306, of the photonic structure 302. In some implementations, the optical absorption structure 310 may be disposed on at least one surface of the of the optical transmission structure 312 (e.g., the optical absorption structure 310 may contact the at least one surface of the optical transmission structure 312 without any cladding material 308 disposed between the optical absorption structure 310 and the optical transmission structure 312). For example, as further shown in FIG. 3, the optical absorption structure 310 may disposed on a bottom surface of the optical transmission structure 312.

In some implementations, the photonic structure 302 may include an optical reflection structure 322 that is disposed within the photonic structure 302. For example, as shown in FIG. 3, the optical reflection structure 322 may be disposed within a layer 306 (e.g., layer 306-1), of the one or more layers 306, of the photonic structure 302. The optical reflection structure 322 may be configured to reflect light. For example, the optical reflection structure 322 may be configured to reflect a particular percentage of light (e.g., a percentage amount of light that satisfies a percentage threshold), such as 20 percent, 35 percent, 60 percent, or 65 percent of light, that falls incident on the optical reflection structure 322. The optical reflection structure 322 may include a set of metal mirror layers (e.g., comprising silver, gold, or another reflective metal), a set of dielectric mirror layers (e.g., alternating hydrogenated silicon layers and silicon dioxide layers), and/or another set of layers configured to reflect light.

In some implementations, the optical reflection structure 322 may be configured to reflect light associated with the second wavelength range (e.g., that is described herein in relation to FIG. 1). For example, the optical reflection structure 322 may be configured to reflect light that has a wavelength within a wavelength range of 800-1199 nm (e.g., light that has a wavelength that is greater than or equal to 800 nm and less than or equal to 1199 nm). In some implementations, the optical reflection structure 322 may be configured to reflect light beams (e.g., that are associated with the second wavelength range and that are provided by the light source 314, as described herein) towards the optical absorption structure 310 when the light beams fall incident on a surface of the optical reflection structure 322 within a particular incident angle range (e.g., within an angle range of 30 degrees of a normal line of the surface of the optical reflection structure 322).

In some implementations, the light source 314 may be disposed over a surface of the photonic structure 302. For example, as shown in FIG. 3, the light source 314 may be disposed over a right-side surface of the photonic structure 302. Accordingly, as further shown in FIG. 3, the light source 314 may be configured to provide one or more light beams 316 (e.g., that are same as, or similar to, the one or more light beams 116 described herein in relation to FIG. 1) to a region 318 of the surface of the photonic structure 302 (e.g., a region 318 of the right-side surface of the photonic structure 302). In some implementations, the region 318 may include an antireflective coating (e.g., in a same or similar manner as that of the region 118 described herein in relation to FIG. 1).

In some implementations, the light source 314 may be configured to provide the one or more light beams 316 to the optical absorption structure 310 (e.g., via reflection by the optical reflection structure 322). For example, the light source 314 may be aimed to provide the one or more light beams 316 such that the one or more light beams 316 enter the photonic structure 302 via the region 318 of the right-side surface of the photonic structure 302 and propagate through a portion of the cladding material 308 (e.g., because the cladding material 308 is transmissive to light associated with the second wavelength range, in a same or similar manner as that of the cladding material 108 described herein in relation to FIG. 1) to a surface (e.g., a top surface) of the optical reflection structure 322, which reflects the one or more light beams 316 to the optical absorption structure 310 in the layer 306-1.

In some implementations, the optical absorption structure 310 may be configured to generate heat 320 when a light beam with a wavelength that is within the second wavelength range falls incident on the optical absorption structure 310 (e.g., in a similar manner as that of the optical absorption structure 110 described herein in relation to FIG. 1). In some implementations, the optical absorption structure 310 may be configured to provide the heat 320 to the optical transmission structure 312. For example, the optical absorption structure 310 may provide the heat 320 to the optical transmission structure 312 because the optical absorption structure 310 is disposed on the at least one surface of the optical transmission structure 312. In some implementations, one or more optical properties of the optical transmission structure 312 may change as a result of the optical absorption structure 310 generating and providing the heat 320 to the optical transmission structure 312 (e.g., in a same or similar manner as that of optical transmission structure 112 described herein in relation to FIG. 1).

As indicated above, FIG. 3 is provided as an example. Other examples may differ from what is described with regard to FIG. 3. In practice, the photonic structure 302 may include additional layers and/or structures, fewer layers and/or structures, different layers and/or structures, or differently arranged layers and/or structures than those shown in FIG. 3.

Figure 4:
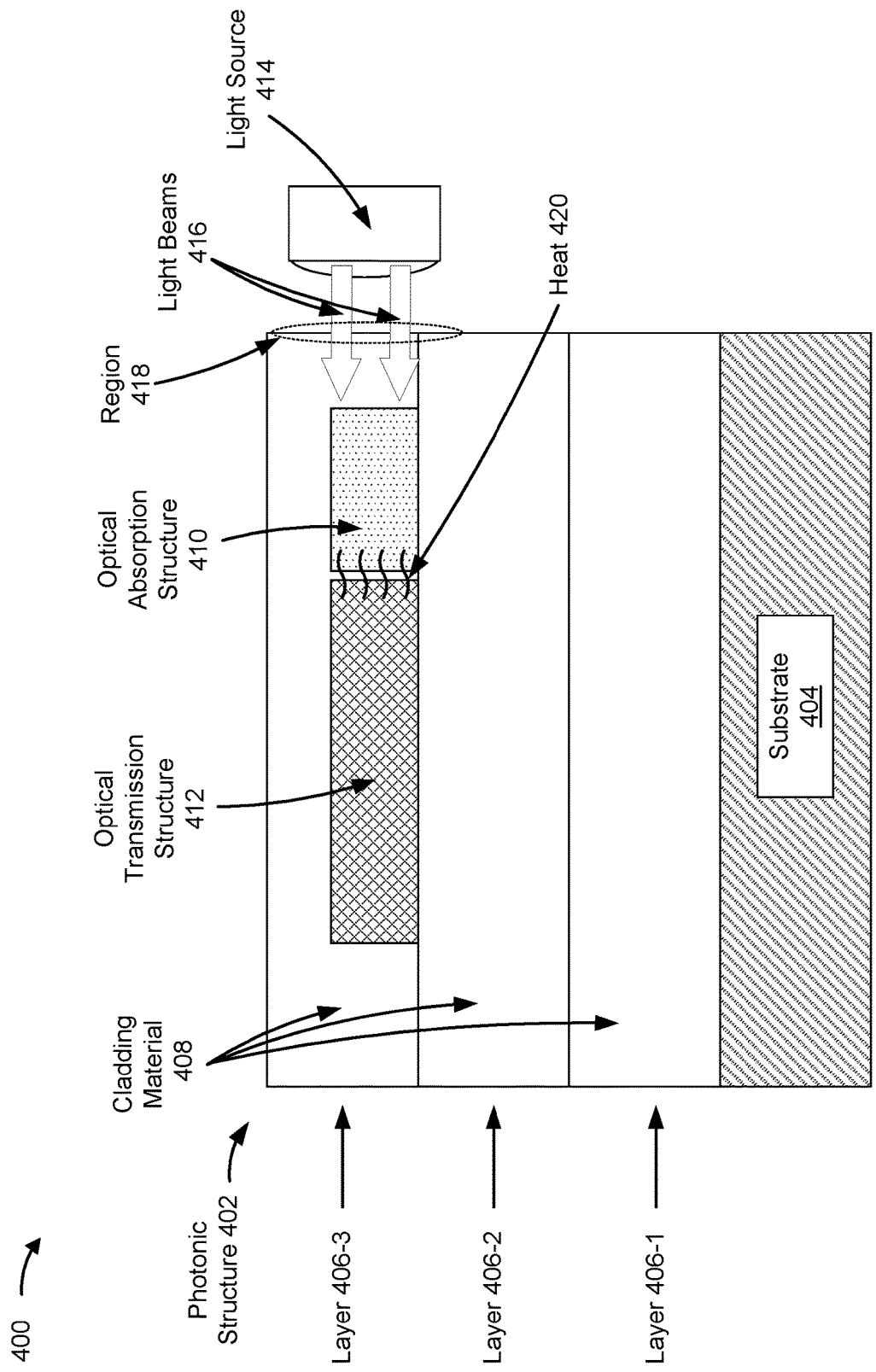
FIG. 4 is a diagram of an example photonic system described herein.

FIG. 4 is a diagram of an example photonic system 400 described herein. As shown in FIG. 4, the photonic system 400 may include a photonic structure 402, which may be similar to the photonic structure 102 described herein in relation to FIG. 1. For example, the photonic system 400 may include a substrate 404, one or more layers 406, a cladding material 408, an optical absorption structure 410, and/or an optical transmission structure 412 that are the same as, or similar to, corresponding elements of the photonic structure 102 described herein in relation to FIG. 1. In some implementations, the photonic system 400 may include a light source 414, which may be the same as, or similar to, the light source 114 described herein in relation to FIG. 1.

In some implementations, the optical transmission structure 412 and the optical absorption structure 410 may be disposed in a same layer 406, of the one or more layers 406, of the photonic structure 402. For example, as shown in FIG. 4, the optical absorption structure 410 and the optical transmission structure 412 may be included in a layer 406 (e.g., layer 406-3), of the one or more layers 406, of the photonic structure 402 (e.g., laterally next to each other in the layer 406-3). In some implementations, the optical absorption structure 410 may be adjacent to at least one surface of the of the optical transmission structure 412 (e.g., a distance between the optical absorption structure 410 and the at least one surface of the optical transmission structure 412 may satisfy a distance threshold, which may be less than or equal to 100 nm). For example, as further shown in FIG. 4, the optical absorption structure 410 may be adjacent to a right-side surface of the optical transmission structure 412.

In some implementations, the light source 414 may be disposed over a surface of the photonic structure 402. For example, as shown in FIG. 4, the light source 414 may be disposed over a right-side surface of the photonic structure 402. Accordingly, as further shown in FIG. 4, the light source 414 may be configured to provide one or more light beams 416 (e.g., that are same as, or similar to, the one or more light beams 116 described herein in relation to FIG. 1) to a region 418 of the surface of the photonic structure 402 (e.g., a region 418 of the right-side surface of the photonic structure 402). In some implementations, the region 418 may include an antireflective coating (e.g., in a same or similar manner as that of the region 118 described herein in relation to FIG. 1). In some implementations, the light source 414 may be configured to provide the one or more light beams 416 to the optical absorption structure 410 (e.g., via the region 418 of the photonic structure 402). For example, the light source 414 may be aimed to provide the one or more light beams 416 such that the one or more light beams 416 enter the photonic structure 402 via the region 418 of the right-side surface of the photonic structure 402 and propagate through a portion of the cladding material 408 (e.g., because the cladding material 408 is transmissive to light associated with the second wavelength range, in a same or similar manner as that of the cladding material 108 described herein in relation to FIG. 1) to the optical absorption structure 410 in the layer 406-3.

In some implementations, the optical absorption structure 410 may be configured to generate heat 420 when a light beam with a wavelength that is within the second wavelength range falls incident on the optical absorption structure 410 (e.g., in a similar manner as that of the optical absorption structure 110 described herein in relation to FIG. 1). In some implementations, the optical absorption structure 410 may be configured to provide the heat 420 to the optical transmission structure 412. For example, the optical absorption structure 410 may provide the heat 420 to the optical transmission structure 412 because the optical absorption structure 410 is adjacent to the at least one surface of the optical transmission structure 412. In some implementations, one or more optical properties of the optical transmission structure 412 may change as a result of the optical absorption structure 410 generating and providing the heat 420 to the optical transmission structure 412 (e.g., in a same or similar manner as that of optical transmission structure 112 described herein in relation to FIG. 1).

As indicated above, FIG. 4 is provided as an example. Other examples may differ from what is described with regard to FIG. 4. In practice, the photonic structure 402 may include additional layers and/or structures, fewer layers and/or structures, different layers and/or structures, or differently arranged layers and/or structures than those shown in FIG. 4.

Figure 5:
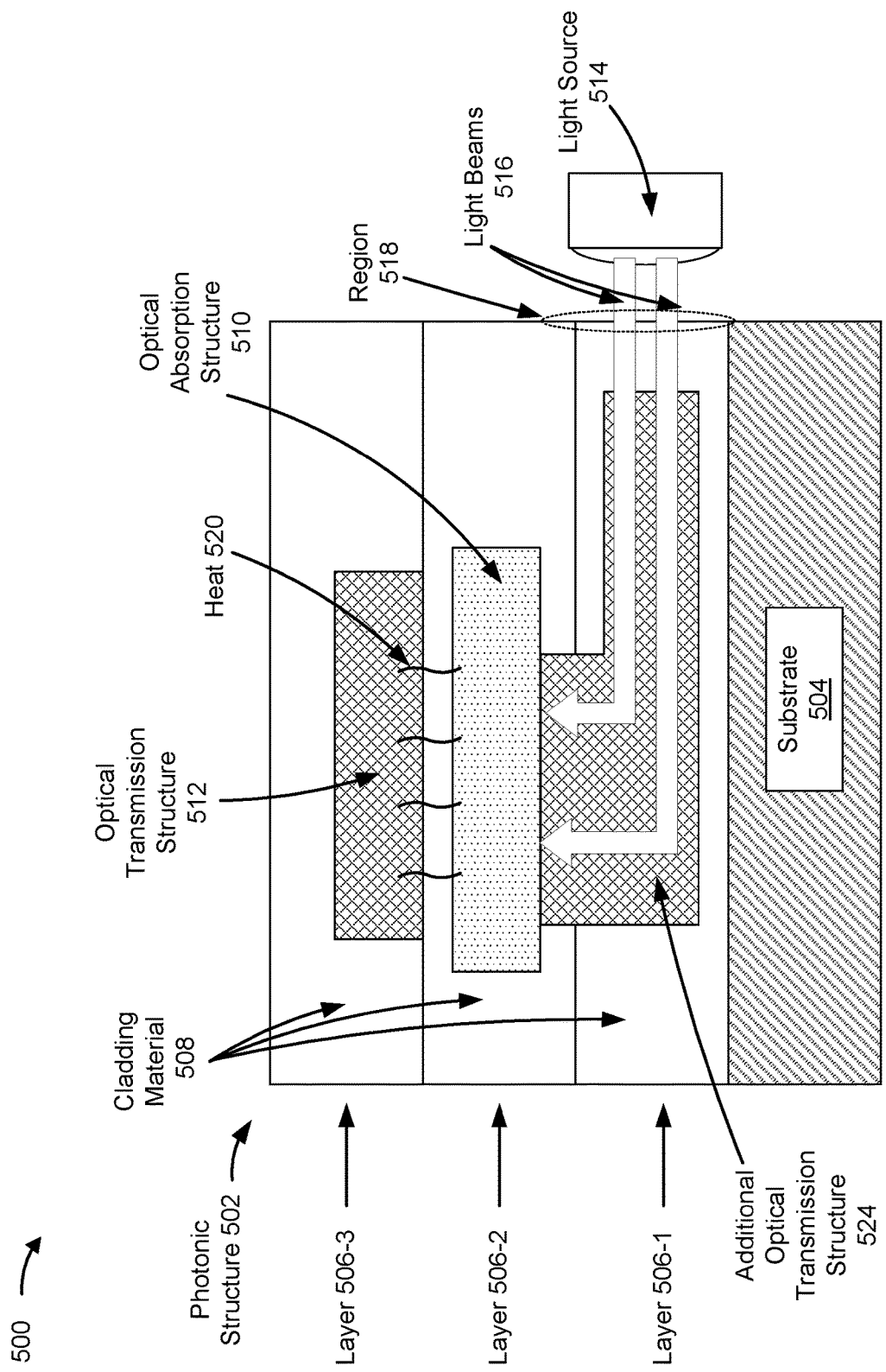
FIG. 5 is a diagram of an example photonic system described herein.

FIG. 5 is a diagram of an example photonic system 500 described herein. As shown in FIG. 5, the photonic system 500 may include a photonic structure 502, which may be similar to the photonic structure 102 described herein in relation to FIG. 1. For example, the photonic system 500 may include a substrate 504, one or more layers 506, a cladding material 508, an optical absorption structure 510, and/or an optical transmission structure 512 that are the same as, or similar to, corresponding elements of the photonic structure 102 described herein in relation to FIG. 1. In some implementations, the photonic system 500 may include a light source 514, which may be the same as, or similar to, the light source 114 described herein in relation to FIG. 1.

In some implementations, the optical transmission structure 512 and the optical absorption structure 510 may be disposed in different layers 506, of the one or more layers 506, of the photonic structure 502. For example, as shown in FIG. 5, the optical absorption structure 510 may be included in a layer 506 (e.g., layer 506-2), of the one or more layers 506, of the photonic structure 502 and the optical transmission structure 512 may be included in another layer 506 (e.g., layer 506-3), of the one or more layers 506, of the photonic structure 502. In some implementations, the optical absorption structure 510 may be adjacent to at least one surface of the of the optical transmission structure 512 (e.g., a distance between the optical absorption structure 510 and the at least one surface of the optical transmission structure 512 may satisfy a distance threshold, which may be less than or equal to 100 nm). For example, as further shown in FIG. 5, the optical absorption structure 510 may be adjacent to a bottom surface of the optical transmission structure 512.

In some implementations, the photonic structure 502 may include an additional optical transmission structure 524 that is disposed within the photonic structure 502. For example, as shown in FIG. 5, the additional optical transmission structure 524 may be disposed within at least one layer 506 (e.g., layers 506-1 and 506-2), of the one or more layers 506, of the photonic structure 502. In some implementations, the additional optical transmission structure 524 may comprise at least one of a non-alkali, oxide solution that includes a cation that is niobium (e.g., a niobium tantalum oxide solution, a niobium titanium oxide solution, and/or a niobium tantalum titanium oxide solution, among other examples), an amorphous silicon material, a hydrogenated amorphous silicon material, a nitride-based material, an oxide-based material, a metal material, or a semiconductor material, among other examples.

The additional optical transmission structure 524 may be configured to transmit light. For example, the additional optical transmission structure 524 may be configured to transmit, within the additional optical transmission structure 524, light associated with the second wavelength range (e.g., that is described herein in relation to FIG. 1). For example, the additional optical transmission structure 524 may be configured to transmit light that has a wavelength within a wavelength range of 800-1199 nm (e.g., light that has a wavelength that is greater than or equal to 800 nm and less than or equal to 1199 nm). In some implementations, the additional optical transmission structure 524 may be configured to transmit light beams (e.g., that are associated with the second wavelength range and that are provided by the light source 514, as described herein) to the optical absorption structure 510 when the light beams fall incident on an input surface of the additional optical transmission structure 524. In some implementations, the optical absorption structure 510 may be positioned within an evanescent field of the additional optical transmission structure 524. For example, the optical absorption structure 510 may be a particular distance from one or more portions of the additional optical transmission structure 524 to be within an evanescent field of the additional optical transmission structure 524 (e.g., to allow optical energy of light beams transmitted by the additional optical transmission structure 524 to transfer from the additional optical transmission structure 524 to the optical absorption structure 510 via evanescent coupling).

In some implementations, the light source 514 may be disposed over a surface of the photonic structure 502. For example, as shown in FIG. 5, the light source 514 may be disposed over a right-side surface of the photonic structure 502. Accordingly, as further shown in FIG. 5, the light source 514 may be configured to provide one or more light beams 516 (e.g., that are same as, or similar to, the one or more light beams 116 described herein in relation to FIG. 1) to a region 518 of the surface of the photonic structure 502 (e.g., a region 518 of the right-side surface of the photonic structure 502). In some implementations, the region 518 may include an antireflective coating (e.g., in a same or similar manner as that of the region 118 described herein in relation to FIG. 1).

In some implementations, the light source 514 may be configured to provide the one or more light beams 516 to the optical absorption structure 510 (e.g., via transmission by the additional optical transmission structure 524). For example, the light source 514 may be aimed to provide the one or more light beams 516 such that the one or more light beams 516 enter the photonic structure 502 via the region 518 of the right-side surface of the photonic structure 502 and propagate through a portion of the cladding material 508 (e.g., because the cladding material 508 is transmissive to light associated with the second wavelength range, in a same or similar manner as that of the cladding material 108 described herein in relation to FIG. 1) to an input surface (e.g., a right-side surface) of the additional optical transmission structure 524, which transmits the one or more light beams 516 to the optical absorption structure 510 in the layer 506-2. Additionally, or alternatively, when the optical absorption structure 510 is within an evanescent field of the additional optical transmission structure 524, optical energy of the one or more light beams 516 may transfer from the additional optical transmission structure 524 to the optical absorption structure 510 (e.g., via evanescent coupling).

In some implementations, the optical absorption structure 510 may be configured to generate heat 520 when a light beam with a wavelength that is within the second wavelength range falls incident on the optical absorption structure 510 (e.g., in a similar manner as that of the optical absorption structure 110 described herein in relation to FIG. 1). Additionally, or alternatively, the optical absorption structure 510 may be configured to generate heat 520 when optical energy is transferred from the additional optical transmission structure 524 to the optical absorption structure 510 (e.g., via evanescent coupling). In some implementations, the optical absorption structure 510 may be configured to provide the heat 520 to the optical transmission structure 512. For example, the optical absorption structure 510 may provide the heat 520 to the optical transmission structure 512 because the optical absorption structure 510 is adjacent to the at least one surface of the optical transmission structure 512. In some implementations, one or more optical properties of the optical transmission structure 512 may change as a result of the optical absorption structure 510 generating and providing the heat 520 to the optical transmission structure 512 (e.g., in a same or similar manner as that of optical transmission structure 112 described herein in relation to FIG. 1).

As indicated above, FIG. 5 is provided as an example. Other examples may differ from what is described with regard to FIG. 5. In practice, the photonic structure 502 may include additional layers and/or structures, fewer layers and/or structures, different layers and/or structures, or differently arranged layers and/or structures than those shown in FIG. 5.

Figure 6:
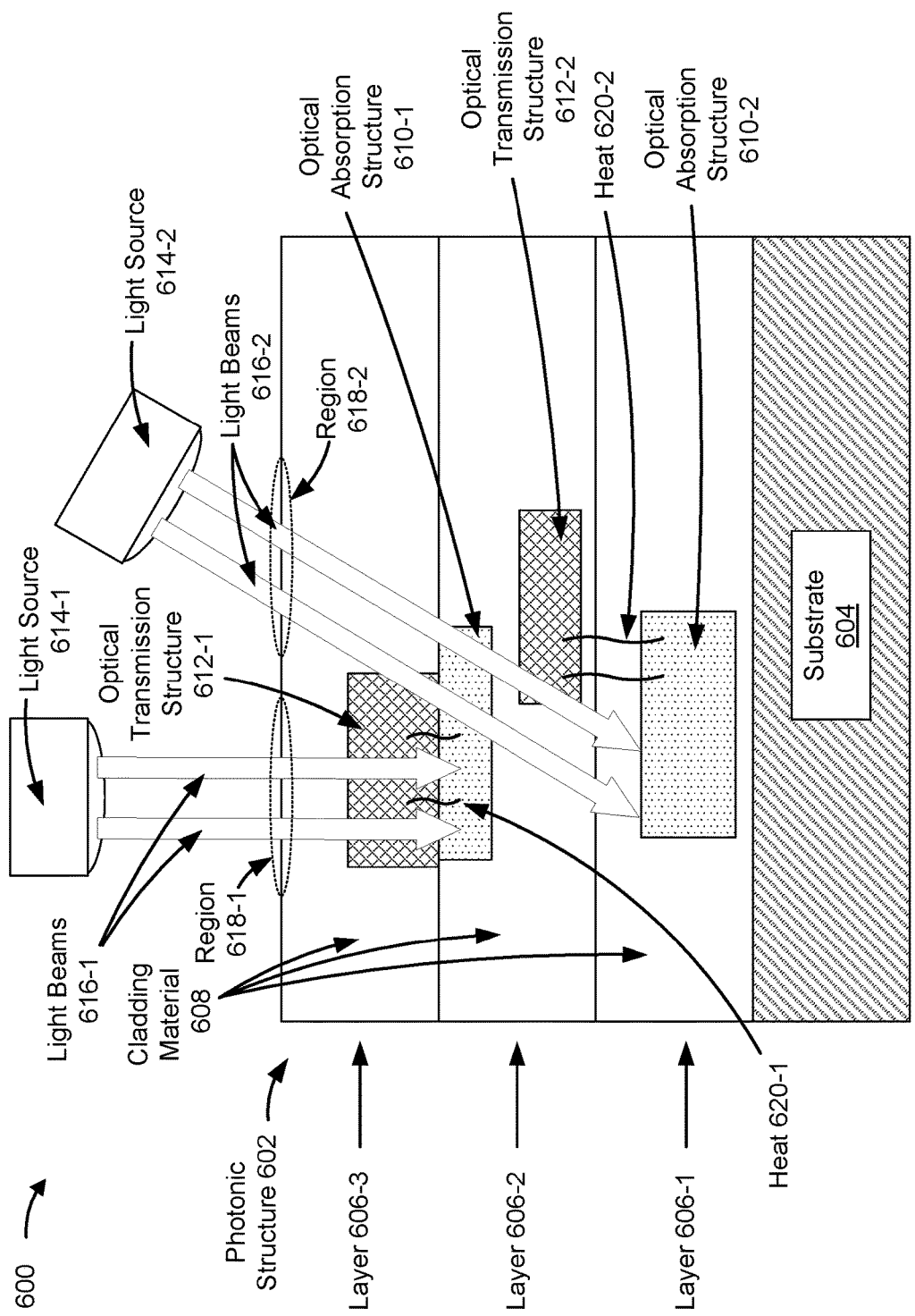
FIG. 6 is a diagram of an example photonic system described herein.

FIG. 6 is a diagram of an example photonic system 600 described herein. As shown in FIG. 6, the photonic system 600 may include a photonic structure 602, which may be similar to the photonic structure 102 described herein in relation to FIG. 1. For example, the photonic system 600 may include a substrate 604, one or more layers 606, a cladding material 608, a plurality of optical absorption structures 610 (shown as optical absorption structures 610-1 and 610-2), and/or a plurality of optical transmission structures 612 (shown as optical transmission structures 612-1 and 612-2) that are the same as, or similar to, corresponding elements of the photonic structure 102 described herein in relation to FIG. 1. In some implementations, the photonic system 600 may include a plurality of light sources 614 (shown as light sources 614-1 and 614-2), which may be the same as, or similar to, the light source 114 described herein in relation to FIG. 1.

In some implementations, the plurality of optical transmission structures 612 may be disposed in different layers 606, of the one or more layers 606, of the photonic structure 602. For example, as shown in FIG. 6, a first optical transmission structure 612-1 may be included in a layer 606 (e.g., layer 606-3), of the one or more layers 606, of the photonic structure 602 and a second optical transmission structure 612-2 may be included in another layer 606 (e.g., layer 606-2), of the one or more layers 606, of the photonic structure 602. Each of the plurality of optical transmission structures 612 may be configured to transmit light associated with a particular wavelength range. For example, in relation to FIG. 6, the first optical transmission structure 612-1 may be configured to transmit light associated with a first wavelength range and the second optical transmission structure 612-2 may be configured to transmit light associated with a second wavelength range (e.g., that is different than the first wavelength range, or, alternatively, at least partially not coextensive with the first wavelength range).

In some implementations, each of the plurality of optical absorption structures 610 may be disposed within a threshold distance of a corresponding optical transmission structure 612 of the plurality of optical transmission structures 612. For example, as shown in FIG. 6, a first optical absorption structure 610-1 may be included in the layer 606-2 and may be disposed on (e.g., disposed within a first threshold distance of) at least one surface (e.g., a bottom surface) of the first optical transmission structure 612-1 and a second optical absorption structure 610-2 may be included in the layer 606-1 and may be adjacent to (e.g., disposed within a second threshold distance of) at least one surface (e.g., a bottom surface) of the second optical transmission structure 612-2. Each of the plurality of optical absorption structures 610 may be configured to absorb light associated with a particular wavelength range and to generate and provide heat to a corresponding optical transmission structure 612 when a light beam with a wavelength that is within the particular wavelength range falls incident on the optical absorption structure 610. For example, the first optical absorption structure 610-1 may be configured to absorb light associated with a third wavelength range (e.g., that is different than the first wavelength range, or, alternatively, at least partially not coextensive with the first wavelength range) and to generate and provide heat to the first optical transmission structure 612-1 when a light beam with a wavelength that is within the third wavelength range falls incident on the first optical absorption structure 610-1. As another example, the second optical absorption structure 610-2 may be configured to absorb light associated with a fourth wavelength range (e.g., that is different than the second wavelength range, or, alternatively, at least partially not coextensive with the second wavelength range) and to generate and provide heat to the second optical transmission structure 612-2 when a light beam with a wavelength that is within the fourth wavelength range falls incident on the second optical absorption structure 610-2.

In some implementations, the plurality of optical transmission structures 612 may be configured to be transmissive to light associated with wavelength ranges that are absorbed by the plurality of optical absorption structures 610. For example, each of the first optical transmission structure 612-1 and the second optical transmission structure 612-2 may be configured to be transmissive to light associated with the third wavelength range and the fourth wavelength range. Additionally, or alternatively, each of the optical absorption structures 610 may be configured to be transmissive to light associated with wavelength ranges that are absorbed by other optical absorption structures 610 of the plurality of optical absorption structures 610. For example, the first optical absorption structure 610-1 may be configured to be transmissive to light associated with the fourth wavelength range and the second optical absorption structure 610-2 may be configured to be transmissive to light associated with the third wavelength range. Additionally, or alternatively, the cladding material 608 may be configured to be transmissive to light associated with the wavelength ranges that are absorbed by the plurality of optical absorption structures 610.

In some implementations, each of the plurality of light sources 614 may be disposed over at least one surface of the photonic structure 102. For example, as shown in FIG. 6, a first light source 614-1 may be disposed over a top surface of the photonic structure 602 and a light source 614-2 may be disposed over the top surface of the photonic structure 602. Accordingly, each of the plurality of light sources 614 may be configured to provide one or more light beams 616 to a particular region 618, of a plurality of regions 618, of the at least one surface of the photonic structure 602 (e.g., a plurality of regions 618 of the top surface of the photonic structure 602). For example, as shown in FIG. 6, the first light source 614-1 may be configured to provide one or more light beams 616-1 to a first region 618-1 of the top surface of the photonic structure 602 and the second light source 614-2 may be configured to provide one or more light beams 616-2 to a second region 618-2 of the top surface of the photonic structure 602. Each of the plurality of regions 618 may include an antireflective coating (e.g., in a same or similar manner as that of the region 118 described herein in relation to FIG. 1).

In some implementations, each of the plurality of light sources 614 may be configured to provide the one or more light beams 616 to a corresponding optical absorption structure 610 of the plurality of optical absorption structures 610. For example, the first light source 614-1 may be aimed to provide the one or more light beams 616-1 such that the one or more light beams 616-1 enter the photonic structure 602 via the region 618-1 of the top surface of the photonic structure 602 and propagate through a portion of the cladding material 608 and the first optical transmission structure 612-1 (e.g., because the cladding material 608 and the first optical transmission structure 612-1 are transmissive to light associated with the third wavelength range) to the first optical absorption structure 610-1 in the layer 606-2. As another example, the second light source 614-2 may be aimed to provide the one or more light beams 616-2 such that the one or more light beams 616-2 enter the photonic structure 602 via the region 618-2 of the top surface of the photonic structure 602 and propagate through a portion of the cladding material 608, a portion of the first optical transmission structure 612-1, a portion of the first optical absorption structure 610-1, and a portion of the second optical transmission structure 612-2 (e.g., because the cladding material 608, the first optical transmission structure 612-1, the portion of the first optical absorption structure 610-1, and the portion of the second optical transmission structure 612-2 are transmissive to light associated with the fourth wavelength range) to the second optical absorption structure 610-2 in the layer 606-1.

In some implementations, each of plurality of optical absorption structures 610 may be configured to generate heat 620 when a light beam with a wavelength that is within a wavelength range that is absorbed by the optical absorption structures 610 falls incident on the optical absorption structure 610. The optical absorption structure 610 may provide the heat 620 to a corresponding optical transmission structure 612 of the plurality of optical transmission structures 612. For example, the first optical absorption structure 610-1 may generate heat 620-1 when the one or more light beams 616-1 fall incident on the first optical absorption structure 610-1 and the first optical absorption structure 610-1 may provide the heat 620-1 to the first optical transmission structure 612-1 (e.g., because the first optical absorption structure 610-1 is disposed on the at least one surface of the first optical transmission structure 612-1). As another example, the second optical absorption structure 610-2 may generate heat 620-2 when the one or more light beams 616-2 fall incident on the second optical absorption structure 610-2 and the second optical absorption structure 610-2 may provide the heat 620-2 to the second optical transmission structure 612-2 (e.g., because the second optical absorption structure 610-2 is disposed adjacent to the at least one surface of the second optical transmission structure 612-2).

As indicated above, FIG. 6 is provided as an example. Other examples may differ from what is described with regard to FIG. 6. In practice, the photonic structure 602 may include additional layers and/or structures, fewer layers and/or structures, different layers and/or structures, or differently arranged layers and/or structures than those shown in FIG. 6.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A photonic system, comprising:
   an optical transmission structure configured to transmit light associated with a first wavelength range;
   an optical absorption structure configured to:
   absorb light associated with a second wavelength range, and
   provide heat to the optical transmission structure; and
   one or more light sources configured to provide, to the optical absorption structure, one or more light beams with a wavelength that is within the second wavelength range.

2. The photonic system of claim 1, wherein the heat is configured to change one or more optical properties of the optical transmission structure.

3. The photonic system of claim 2, wherein the one or more optical properties include a refractive index of the optical transmission structure.

4. The photonic system of claim 1, wherein the one or more light sources include one or more of a laser device, a light-emitting diode (LED) light device, an incandescent light device, a fluorescent light device, or a halogen light device.

5. The photonic system of claim 1, wherein the one or more light sources include a light source that is disposed over a top surface of a photonic structure that includes the optical absorption structure and the optical transmission structure.

6. The photonic system of claim 5,
   wherein, to provide the one or more light beams, the one or more light sources are configured to:
   provide the one or more light beams to a region of the top surface of the photonic structure, and
   wherein the region includes an antireflective coating configured to reduce reflection of light associated with the second wavelength range.

7. The photonic system of claim 5,
   wherein the photonic structure further includes cladding material between the optical absorption structure and the optical transmission structure, and
   wherein, to provide the one or more light beams, the one or more light sources are configured to:
   provide the one or more light beams via a region of the top surface of the photonic structure such that the one or more light beams enter the photonic structure via the region of the top surface of the photonic structure and propagate through a portion of the cladding material to the optical absorption structure.

8. The photonic system of claim 5,
   wherein the photonic structure further includes cladding material between the top surface of the photonic structure and the optical transmission structure, and
   wherein, to provide the one or more light beams, the one or more light sources are configured to:
   provide the one or more light beams via a region of the top surface of the photonic structure such that the one or more light beams enter the photonic structure via the region of the top surface of the photonic structure and propagate through a portion of the cladding material and the optical transmission structure.

9. The photonic system of claim 1, wherein the one or more light sources include a light source that is disposed over a side surface of a photonic structure that includes the optical absorption structure and the optical transmission structure.

10. The photonic system of claim 9,
    wherein, to provide the one or more light beams, the one or more light sources are configured to:
    provide the one or more light beams to a region of the side surface of the photonic structure, and
    wherein the region includes an antireflective coating configured to reduce reflection of light associated with the second wavelength range.

11. A photonic system, comprising:
    an optical transmission structure;
    an optical reflection structure;
    an optical absorption structure configured to:
    absorb light, and
    provide heat to the optical transmission structure; and
    one or more light sources configured to provide, to the optical absorption structure, one or more light beams via reflection by the optical reflection structure.

12. The photonic system of claim 11, wherein the optical reflection structure is disposed within a layer, of a photonic structure, that includes the optical absorption structure.

13. The photonic system of claim 11, wherein the one or more light sources include a light source that is disposed over a side surface of a photonic structure that includes the optical absorption structure, the optical reflection structure, and the optical transmission structure.

14. The photonic system of claim 13,
    wherein, to provide the one or more light beams, the one or more light sources are configured to:
    provide the one or more light beams to a region of the side surface of the photonic structure, and
    wherein the region includes an antireflective coating configured to reduce reflection of light.

15. The photonic system of claim 11, wherein the optical reflection structure is configured to reflect 65 percent or less of light that falls incident on the optical reflection structure.

16. The photonic system of claim 11, wherein the optical reflection structure includes one or more of:
    a set of metal mirror layers, or
    a set of dielectric mirror layers that includes alternating hydrogenated silicon layers and silicon dioxide layers.

17. The photonic system of claim 11,
    wherein the optical transmission structure is configured to transmit light associated with a first wavelength range,
    wherein the absorbed light is associated with a second wavelength range, and
    wherein the one or more light beams are associated with a wavelength that is within the second wavelength range.

18. A photonic system, comprising:
a photonic structure including:
- an optical transmission structure configured to transmit light,
- cladding material, and
- an optical absorption structure configured to:
  - absorb light, and
  - provide heat to the optical transmission structure; and one or more light sources configured to provide one or more light beams via a region of a top surface of the photonic structure such that the one or more light beams enter the photonic structure via the region of the top surface of the photonic structure and propagate through a portion of the cladding material and the optical transmission structure.

19. The photonic system of claim 18,
wherein the transmitted light is associated with a first wavelength range,
wherein the absorbed light is associated with a second wavelength range, and
wherein the one or more light beams are associated with a wavelength that is within the second wavelength range.

20. The photonic system of claim 18, wherein the cladding material is between the top surface of the photonic structure and the optical transmission structure.

* * * * *